Figure 1:
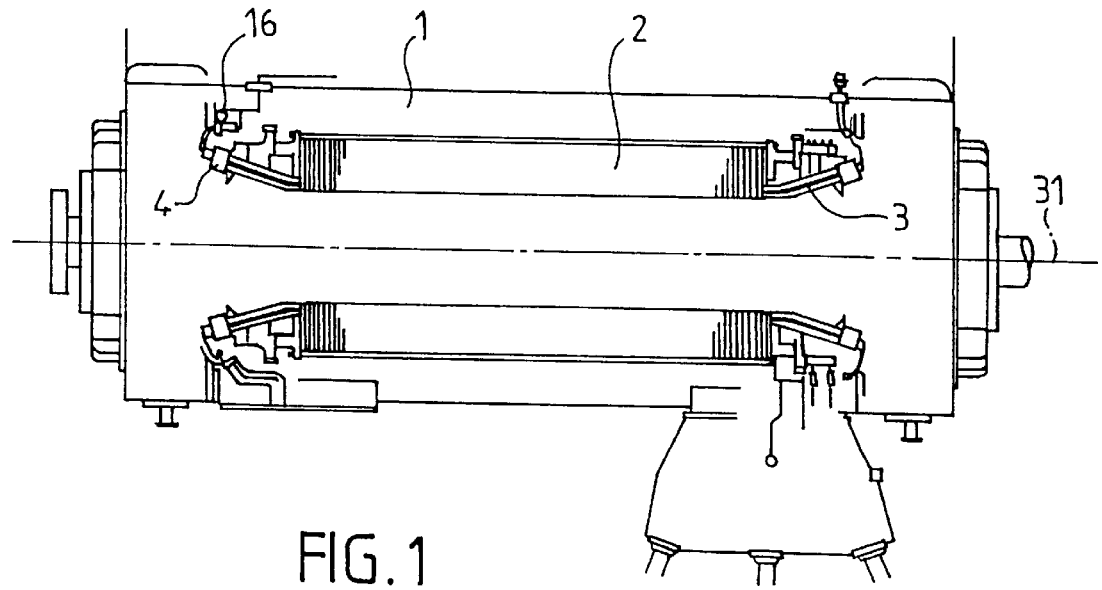

United States Patent [19]
Champagne et al.

[11] Patent Number: 5,809,632
[45] Date of Patent: Sep. 22, 1998

[54] METHOD FOR REPAIRING A COOLING FLUID BOX OF AN ELECTRIC ALTERNATOR STATOR BAR

[75] Inventors: Alain Champagne, La Longueville; Christophe Demarez, Lez Bavay; Michel Farineau, Boussois, all of France

[73] Assignee: Jeumont Industrie, Courbevoie, France

[21] Appl. No.: 679,044

[22] Filed: Jul. 12, 1996

[30] Foreign Application Priority Data

Jul. 13, 1995 [FR] France .................................. 95 08538

[51] Int. Cl.$^6$ .................................................. H02K 15/00
[52] U.S. Cl. .................... 29/596; 29/402.03; 29/402.04; 29/402.09; 29/402.13; 29/402.16; 29/890.031; 310/42; 310/54; 310/59
[58] Field of Search ........................... 29/402.03, 402.04, 29/402.09, 402.13, 402.16, 890.031, 596; 310/54, 59, 60, 64, 65, 42

[56] References Cited

U.S. PATENT DOCUMENTS 4,629,917  12/1986  Brem ..................................... 310/60 A
5,557,837   9/1996  Thiard-Laforet et al. ........... 29/402.16
5,659,944   8/1997  Thiard-Laforet et al. ........... 29/402.16

*Primary Examiner*—Timothy V. Eley
*Assistant Examiner*—Benjamin M. Halpern
*Attorney, Agent, or Firm*—Frommer Lawrence & Haug LLP; William S. Frommer

[57] ABSTRACT

The invention concerns a method for repairing a cooling fluid box of the cooling circuit of an alternator stator bar, the imperviousness between the box and the stator bar being defective, wherein:

the cooling circuit (9, 12, 6, 7, 16) is disconnected, the box (4) is cut along a plane approximately perpendicular to the axis (31) of the alternator, imperviousness is established between the stator bar (3) and the box (4), a cover (17) is secured to the box (4) along the cutting plane, the stator bar is cooled during the imperviousness resumption and cover fixing operations, the electric circuit of the stator bar (3) is re-established, the cooling circuit of the stator bar is connected.

9 Claims, 4 Drawing Sheets

METHOD FOR REPAIRING A COOLING FLUID BOX OF AN ELECTRIC ALTERNATOR STATOR BAR

The invention concerns a method for repairing a cooling fluid box allowing for passage of the cooling fluid of the stator bars of an electric alternator and in particular a high-powered alternator, 600 to 1300 MW for example.

The winding of the stator of a high-powered alternator is constituted of a set of bars, generally cooled with a cooling fluid which traditionally is water. Hydrogen or air can also be used.

Each bar extremity is ended by a cooling fluid box which ensures both the electric link with the rest of the winding and the link with the other elements of the cooling circuit.

Imperviousness between the cooling fluid boxes and the stator bars must be provided to prevent the cooling fluid from leaking between the outside and inside of the cooling boxes. In fact, these leaks can result in causing isolation defects and problems of corrosion.

Thus, when significant imperviousness defects are observed, it is necessary to change the relevant bars of the stator, this operation proving to be extremely expensive.

The aim of the invention is to mitigate these drawbacks by offering a repair method not requiring a complete change of the stator bars exhibiting an imperviousness defect between the cooling fluid boxes.

Accordingly, the invention concerns a method for repairing a cooling box of an alternator stator bar when the imperviousness between said box and said stator bar is defective, wherein:

the cooling circuit is disconnected, said box is cut along a plane approximately perpendicular to the axis of the alternator, imperviousness is embodied between the stator bar and the box, a cover is secured to the box along said cutting plane, the stator bar is cooled during the imperviousness resumption and cover fixing operations, the electric circuit of the stator bar is re-established, the cooling circuit of the stator bar is connected.

The following characteristics of the method of the invention may also be taken into consideration, either separately or according to all their possible technical combinations:

the stator bar is cooled with hollow elements made of a metal possessing good heat conductivity disposed on both sides of the stator bar and in which a cooling liquid is made to circulate.

as the stator bar is formed of hollow conductors for circulation of the cooling fluid, and of solid conductors, these solid and hollow conductors traversing the bottom of the cooling fluid box, imperviousness is established between the stator bar and said box by placing an imperviousness material between the conductors and the bottom of the box.

the material placed to establish imperviousness is a soldering joint, the cover is secured by soldering a joint to the cooling fluid box, before soldering the cover, the cutting surface of the cooling box portion left in place is straightened by machining, a metal foil filler is disposed between the two surfaces of the weld joint between the cooling fluid box and the cover, the welding of the cover onto the cooling fluid box is effected via induction heating, the induction heating means are placed outside the cooling fluid box at the surfaces of the weld joint, the cooling fluid box is also cut from a second stator bar which is electrically linked to the one whose imperviousness is defective and repaired, a cover then being welded onto this second box, the electric circuit then being re-established by means of a connector fixed between the two covers.

Figure 2:
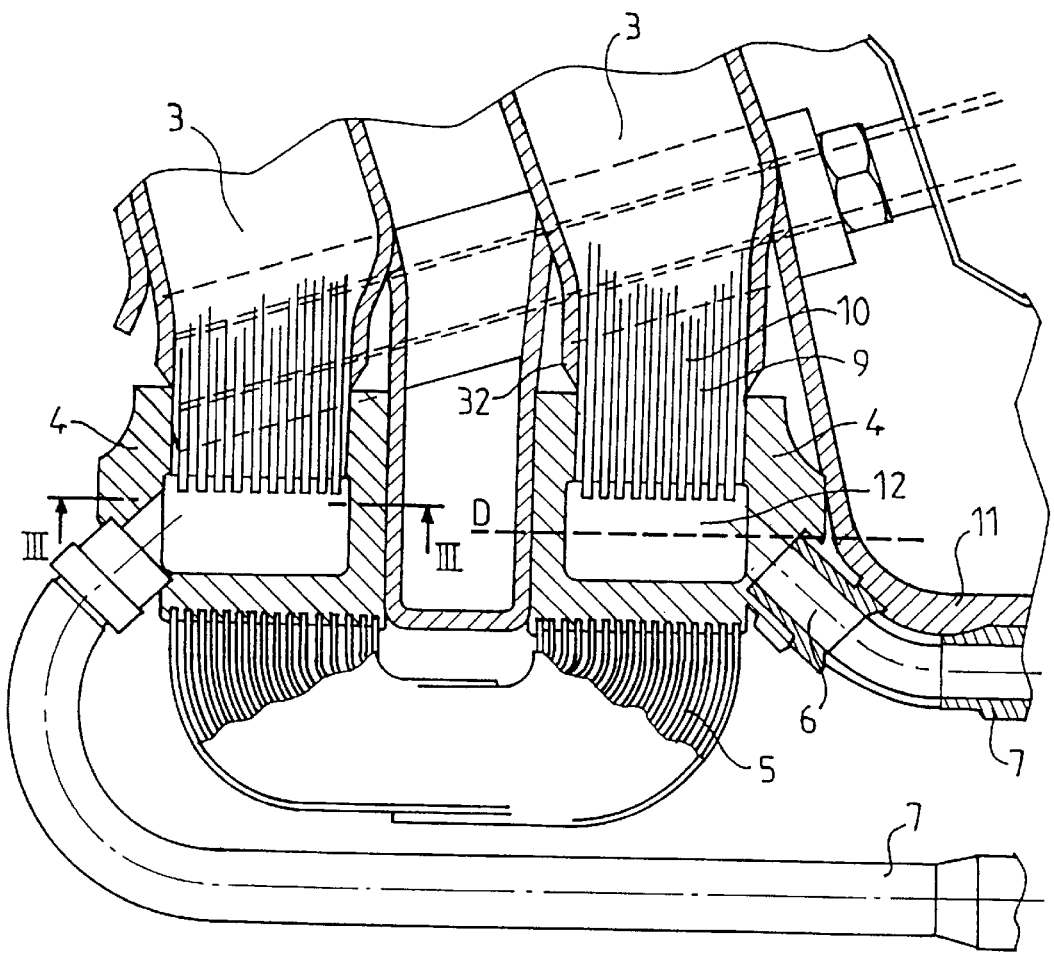
Figure 3:
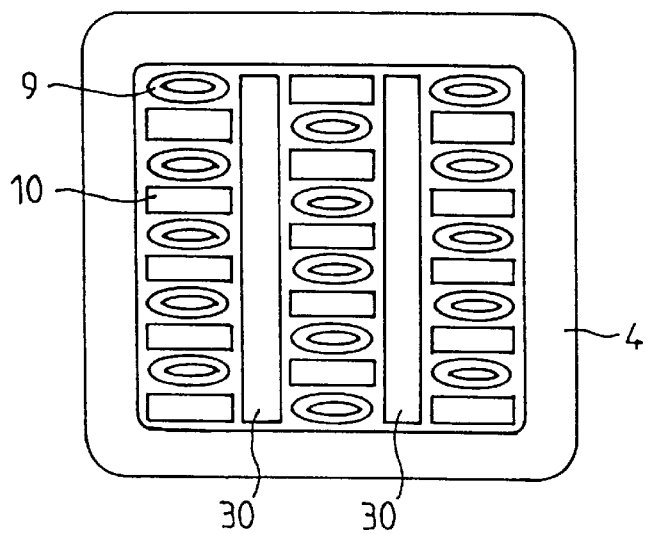
Figure 4:
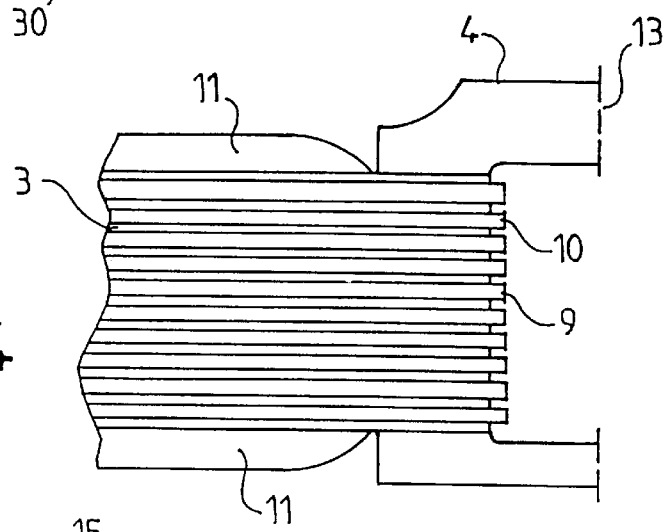
Figure 5:
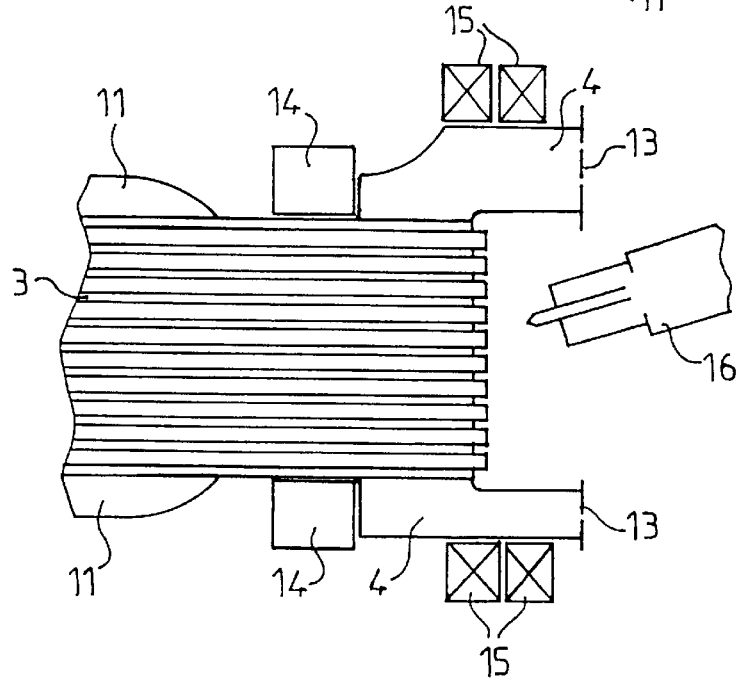
Figure 6:
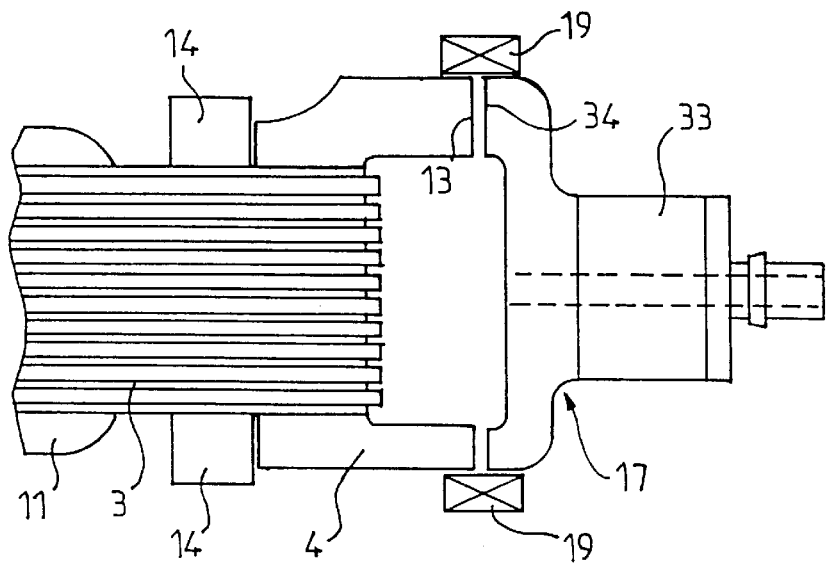
Figure 7:
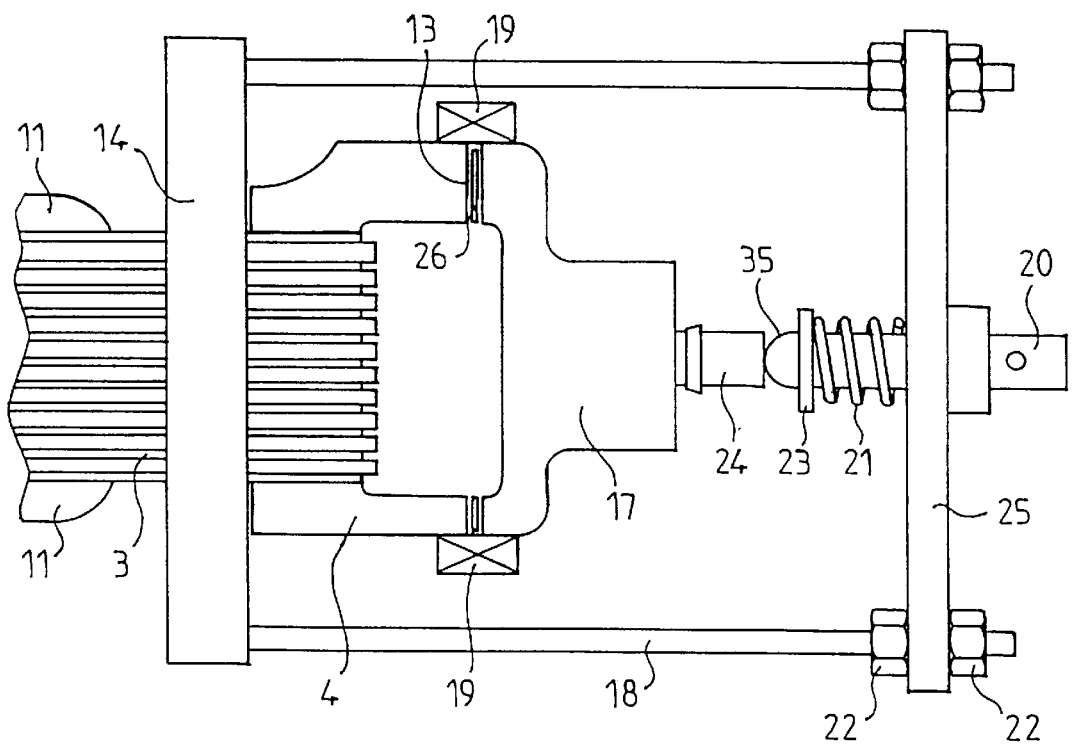
Figure 8:
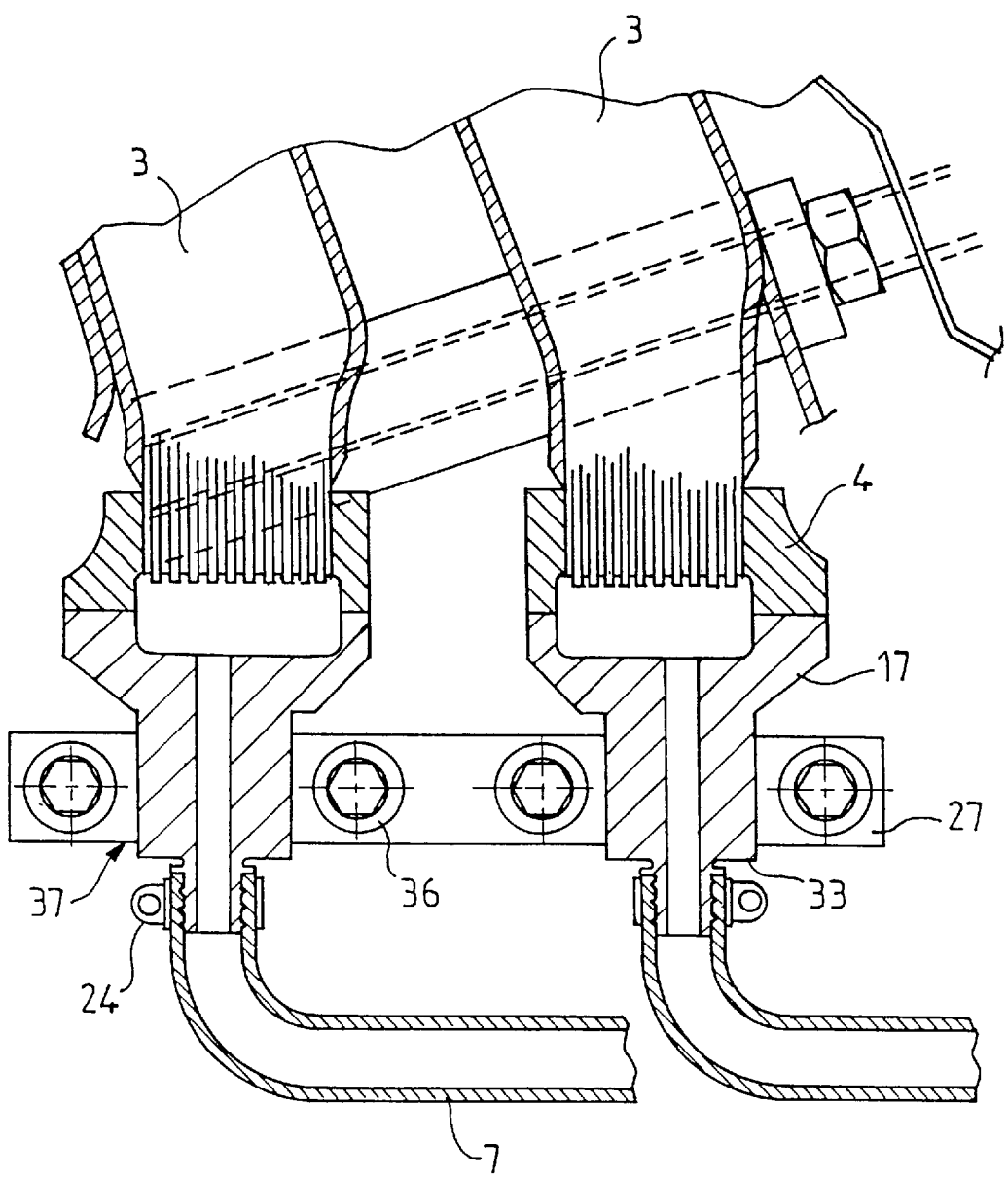

Other objectives, advantages and characteristics of the method of the invention shall appear more readily after reading the following description of non-limitative embodiment modes. This description will be made with reference to the accompanying drawings in which:

FIG. 1 shows a diagrammatic axial sectional view of the stator of an alternator, FIG. 2 shows the extremity of two electrically linked stator bars, FIG. 3 is a diagrammatic sectional view along line III—III of a cooling fluid box, FIG. 4 is a diagrammatic view of the extremity of a stator bar, the cooling fluid box having been cut along the line D of FIG. 2, FIG. 5 is a view similar to FIG. 4 and showing the means for embodying imperviousness between the stator bar and the cooling fluid box, FIG. 6 is a view similar to FIG. 4 and shows the cover welding step onto a previously cut cooling fluid box, FIG. 7 is a partial sectional side view of FIG. 4 and shows the tools used to keep the cover in place on the cooling fluid box during the welding step, and FIG. 8 shows the extremity of two stator bars, the cooling fluid box having a cover and being electrically connected by means of connectors.

The elements common to the different figures shall be denoted by the same references.

FIG. 1 shows the stator of an alternator formed of a casing 1 which supports the magnetic circuit 2 housing the winding. This winding is constituted by a set of bars 3. Each stator bar extremity is ended by a cooling fluid box 4 ensuring the electric linking with the rest of the stator winding and the link with the collectors 16 for the cooling fluid of the bars 3.

The axis of the alternator is denoted by the reference 31.

The winding of the alternators, especially the high-power ones, are traditionally cooled with water circulating inside the stator bars. This type of cooling makes it possible to obtain extremely high current densities in the bars.

For the remainder of the description, the cooling fluid shall be regarded as water, but this would nevertheless not be considered as limitative.

Furthermore, in normal operation, the body is filled with hydrogen having a pressure of several bars which helps to cool the rotor and partly cool the stator.

FIG. 2 shows two stator bars 3 which are electrically connected. This electric link can be provided by a set of copper plates 5. It can also be embodied by means of a solid connection bolted onto the water boxes. This embodiment is not shown on FIG. 2.

Each bar extremity 3 is ended by a water box 4.

Conventionally, a stator bar is formed of hollow conductors 9 for circulation of the cooling water, and solid conductors 10.

The water box has a cavity open opposite the stator bar so as to enable the extremity of the stator bar to penetrate into the water box, providing a chamber 12.

FIG. 3, which is a sectional view of the water box along line III—III of FIG. 2, shows how the hollow conductors 9 and solid conductors 10 are disposed with respect to the water box.

Reference 30 denotes spacers which allow spacing of rows of conductors when producing the bars 3.

The imperviousness of the water box is obtained on producing the stator by simultaneously soldering the conductors 9 and 10, the spacers 30 and the water box 4, which makes it possible to obtain a capillary attraction diffusion of the soldering joint between all these elements. The soldering joint then forms a sealed barrier. It also ensures the electric link between the conductors and the water box.

As shown in FIG. 2, the conductors 9 and 10 slightly project with respect to the bottom of the water box 4.

The cooling water circuit is constituted by:
the hollow conductors 9,
the chamber 12 formed by the water box 4 and the extremity of the bar 3,
the element 6 which traverses the water box 4 and connects it to the collector 16 by means of pipes 7.

These pipes 7 are generally made of Teflon.

Each bar 3 is covered with an insulating covering 11 as far as the rear of the water box 4.

The extremity of each bar also comprises an insulating covering 32 to allow dielectric behaviour between the bar extremities and with respect to the earth. In fact, the usual operating voltages are more than 20 kV.

It is necessary to have perfect imperviousness between the water boxes and the stator bars. In fact, it is advisable to avoid any infiltration of water under the insulating covering 11 when the latter is sealed from the surrounding hydrogen or when the water pressure in the chamber 12 is greater than the hydrogen pressure in the machine. In effect, these infiltrations result in insulation defects which could seriously affect the alternator.

It is also advisable to avoid any hydrogen infiltrating through the insulating covering 11 towards the chamber 12 of the water box when the hydrogen pressure is greater than the water pressure in the chamber 12. These infiltrations cause an inadequate cooling of the relevant stator bar and in particular modify the chemical characteristics of the cooling water of the bars 3. This may create serious problems of corrosion of the hollow conductors 9.

However, imperviousness defects may appear between a water box, the hollow conductors 9, the solid conductors 10 and the spacers 30. These imperviousness defects are due to a lack of any soldering joint between some of these elements which results in leaks between the outside and inside of the water box.

To date, when such an imperviousness defect is observed, it is necessary to change the relevant stator bar, thus significantly increasing costs.

The aim of the method of the invention is to repair water boxes possessing imperviousness defects owing to a lack of a soldering joint. It also takes account of their working environment and in particular of the fact that the stator bars are in a horizontal position and the rest of the winding is close to the water boxes.

Before intervening on the alternator, it is necessary to disconnect the cooling circuit so as to avoid any water circulation during repair.

Then the water box with an imperviousness defect is cut into two portions. The cut is made along a plane approximately perpendicular to the axis 31 of the alternator which passes through the line D shown in FIG. 2.

The water box portion comprising the electric link 5 with the adjacent stator bar is eliminated, as well as the hydraulic connection formed of the element 6 and the pipe 7. The element obtained is shown in FIG. 4.

It is necessary to repair only those water boxes having an imperviousness defect. However, as shall be seen subsequently, it is preferable to cut, not only the water box having an imperviousness defect, but also the water box electrically linked to the one to be repaired. This makes it easier to re-establish the electric connection between the two corresponding stator bars, this connection being of necessity destroyed when the water box is cut before being repaired.

Accordingly, the method of the invention is described with reference to a single water box. However, generally speaking, the same operations, apart from resumption of imperviousness if not required, shall be carried out on the two water boxes of the electrically linked stator bars.

The cutting surface 13 of the water box 4 shown in FIG. 4 is preferably straightened by machining. The aim of this operation is basically to facilitate the welding of a cover on the water box portion left in place, which shall be described subsequently.

The extremity of the conductors 9 and 10 and the inside of the water box 4 then have their oxide film removed and are cleaned.

The insulation covering 11 situated behind the water box 4 is eliminated over a certain distance, as shown in FIG. 5.

Then the cooling means 14 are placed behind the water box 4. These means are able to keep the temperature of the conductors 9 to 10 at a value acceptable by the insulation covering 11 covering the remainder of the stator bar 3.

Accordingly, the insulation covering 11 is eliminated at the extremity of the stator bar so that the cooling means 14 are fully effective.

In the example shown in FIG. 5, the cooling means 14 include two hollow elements made of a metal, such as copper, possessing good heat conductivity. These elements are placed on both sides of the stator bar 3. A cooling fluid, in, particular water, is made to circulate inside said elements. Other cooling means can be used.

The next operation consists of resuming imperviousness between the water box 4 and the stator bar 3. This stage is more particularly shown in FIG. 5.

The step starts by the water box 4 being preheated to a temperature of 250° C. with a device 15. This device is constituted by induction coils.

The resumption of imperviousness is effected by placing a soldering joint between all the conductors 9 and 10 and the spacers 30 and at the interface between these elements and the water box. The use of a TIG torch 16 locally provides the energy required to carry out a suitable soldering joint. Any other heating device could also be used.

After this operation, all the conductors 9 and 10, the interpolated elements 30 and the water box 4 are encompassed with a soldering joint layer with a thickness of preferably several millimetres embodying the sought-after imperviousness.

The water box should then be closed with a cover.

In order to do so, the inside of the water box 4 and the cutting surface 13 are cleaned.

The cooling means 14 are kept in place.

Reference is now made to FIG. 6 which is a view similar to FIG. 4 and showing a cover 17 with a cylindrical extremity 33 and heating means 19.

The cover 17 is placed opposite the box 4, the cutting surface 13 of the box and the extremity surface 34 of the cover being opposite each other. These two surfaces form the faces of the weld joint between the cover and the water box.

The heating means 19 are placed outside the water box 4 at the weld joint and are preferably constituted by an induction coil.

When the faces 13 and 34 of the weld joint have been prepared, a soldering joint metal foil 26 is placed (cf. FIG. 7) between the water box 4 and the cover 17. This metal foil is a filler metal ensuring the soldering joint link between the water box and the cover. The cover 17 is then positioned with respect to the water box.

Reference is now made to FIG. 7 which shows the tool used to keep in place the cover 17 on the water box during the welding stage.

This tool firstly includes threaded rods 18 which are secured to the cooling means 14.

It also includes a plate 25 which is positioned, fixed and kept in place on the rods 18 with nuts 22. The plate 25 is pierced at approximately its centre with a hole so as to allow for passage of a slug 20 having a rounded end piece 35 on the side of the cover 17. This slug 20 is also provided with a nut 23 and a spring 21.

The rounded end piece 33 is housed in the end piece of the water passage 24 of the cover 17. The spring 21 makes it possible to apply to the cover 17 a constant force during the welding operation and thus enables the cover to be kept in place.

Once this retaining tool is in place, the cover 17 is welded onto the water box 4.

The soldering cycle effected by the induction coil 19 needs to be extremely short so as to avoid any excess heating at the level of the insulation covering 20. The heating temperature is about 780° C.

The cooling means 14 cool the rear of the water box and thus ensure that the soldering joints, as well as the soldering joints added during repair, do not melt between the conductors 9 and 10 and the water box. This cooling also makes it possible to ensure that the insulation covering 11 does not reach an excessive temperature.

When the cover is welded onto the water box 4, the holding tool is removed and the elements are cleaned.

It is then necessary to again insulate the rear of the water box so as to re-establish insulation which originally existed.

It is also necessary to re-establish the electric circuit of the stator bar which has been repaired. As indicated earlier, only the stator bars and water boxes having an imperviousness defect need to be repaired. However, each stator bar is electrically linked to another stator bar, as shown in FIG. 2. If only a single water box is repaired, the electric link can only be re-established by reshaping a set of copper plates which originally existed. This operation is therefore long and costly, especially because it involves a relatively long time for immobilising the machine.

This is why it is preferable to cut the water boxes of two adjacent electrically linked stator bars as described earlier. Imperviousness is re-established for the water box or boxes, depending on the case. Then a cover is secured to each of the water boxes. These two covers 17 are shown in FIG. 8.

The electric circuit is therefore re-established by means of two connectors 27 which are fixed together by means of bolts 36. Each of these connectors comprises a recess 37 for passage of the cylindrical portion 33 of the covers 17.

Other types of covers could be used, such as covers with a spherical extremity. In this case, the connectors 27 comprise a recessed portion with a corresponding shape.

Then the pipes 7 are connected to the end pieces 24 placed on the water box covers so as to re-establish the cooling circuit of the stator bars.

Finally, the stator bars are re-insulated.

It is noted that the method of the invention avoids a complete change of the stator bars having an imperviousness defect, as well as their cooling fluid box. It is able to re-establish on site imperviousness between the stator bar and the water box when this imperviousness is defective without interfering with the rest of the winding.

The aim of the reference numerals inserted following the technical characteristics mentioned in the claims is to facilitate understanding and limit in no way the scope thereof.

We claim:

1. A method for repairing a cooling fluid box of a cooling circuit of an alternator stator bar, imperviousness between said box and said stator bar being defective, comprising the steps of:

disconnecting said cooling circuit, cutting said box along a plane approximately perpendicular to an axis of the alternator and thereby disconnecting an electric circuit of the stator bar, establishing imperviousness between the stator bar and the box, securing a cover to the box along said cutting plane, cooling the stator bar while imperviousness is established and the cover is secured, re-establishing the electric circuit of the stator bar, and connecting the cooling circuit of the stator bar.

2. A method according to claim 1, wherein the cooling fluid box has a bottom, the stator bar is formed of solid conductors and hollow conductors for circulation of cooling fluid, and solid conductors said solid and hollow conductors traversing the bottom of the cooling fluid box, and imperviousness between said box and the stator bar is established by placing an imperviousness material between said conductors and the bottom of the box.

3. A method according to claim 2, wherein the imperviousness material is a soldering joint.

4. A method according to claim 3, wherein the stator bar is cooled with the aid of hollow elements made of a metal possessing good heat conductivity and placed on both sides of the stator bar and in which a cooling liquid is made to circulate.

5. A method according to claim 4, wherein the cover is welded onto the cooling fluid box.

6. A method according to claim 5, wherein said cooling fluid box is cut along a cutting surface; and before welding the cover, the cutting surface of that portion of the cooling fluid box left in place is straightened.

7. A method according to claim 6, wherein a filler metal foil is placed between the surfaces of the weld joint between the cooling fluid box and the cover.

8. A method according to claim 7, wherein the cover is welded on the cooling fluid box by induction heating.

9. A method according to claim 8, wherein a cooling fluid box of a second stator bar, electrically linked to the first-mentioned stator bar, is also cut, thereby disconnecting an electric circuit of the second stator bar, and further comprising the steps of welding a cover onto the cooling fluid box of said second stator bar, and re-establishing an electric circuit with the aid of a connector fixed between the covers.

* * * * *

UNITED STATES PATENT AND TRADEMARK OFFICE
CERTIFICATE OF CORRECTION

PATENT NO. : 5,809,632
DATED : September 22, 1998
INVENTOR(S) : Champagne et al.

It is certified that error appears in the above-identified patent and that said Letters Patent is hereby corrected as shown below:

<u>IN THE CLAIMS:</u>

Claim 2, line 4 (column 6, line 33), delete "and solid conductors".

Signed and Sealed this

Eighth Day of December, 1998

Attest:

BRUCE LEHMAN

Attesting Officer

Commissioner of Patents and Trademarks